United States Patent [19]

Shiga

[11] Patent Number: 4,665,887

[45] Date of Patent: May 19, 1987

[54] DIAMOND CUTTER

[76] Inventor: Ikuo Shiga, No. 780-1, Suzuya, Yono, Saitama, Japan

[21] Appl. No.: 795,711

[22] Filed: Nov. 6, 1985

[30] Foreign Application Priority Data

Nov. 26, 1984 [JP] Japan .............................. 59-179236[U]
Jun. 7, 1985 [JP] Japan .............................. 60-85957[U]

[51] Int. Cl.$^4$ .............................................. B28D 1/04
[52] U.S. Cl. ....................................................... 125/15
[58] Field of Search ................... 125/15, 13; 51/206 R

[56] References Cited

U.S. PATENT DOCUMENTS

| | | | |
|---|---|---|---|
| 1,163,356 | 12/1915 | Meyers | 125/15 |
| 2,990,828 | 7/1961 | Hoerer | 125/15 |
| 3,221,728 | 12/1965 | Lindblad | 125/15 |
| 3,338,230 | 8/1967 | Lindblad | 125/15 |
| 3,863,401 | 2/1975 | Schwarzkopf | 125/15 |

FOREIGN PATENT DOCUMENTS

| | | | |
|---|---|---|---|
| 138237 | 4/1985 | European Pat. Off. | 125/15 |
| 716584 | 10/1966 | Italy | 125/15 |
| 288631 | 11/1971 | U.S.S.R. | 125/15 |

Primary Examiner—Harold D. Whitehead
Attorney, Agent, or Firm—Browdy and Neimark

[57] ABSTRACT

A proposed diamond cutter is provided with man-made diamond grains on the circumference of a disc base plate, and is formed with slits from the outer circumference to the central part thereof. The slit is angled about 30° with respect to a radial direction of said plate, so that the heat caused during cutting is prevented from running toward the central part, thereby to save the base plate from crackings. Minor cutting edges are also provided in addition to said angled cutting edge, and the cutting effect is increased.

1 Claim, 4 Drawing Figures

FIG_1
PRIOR ART
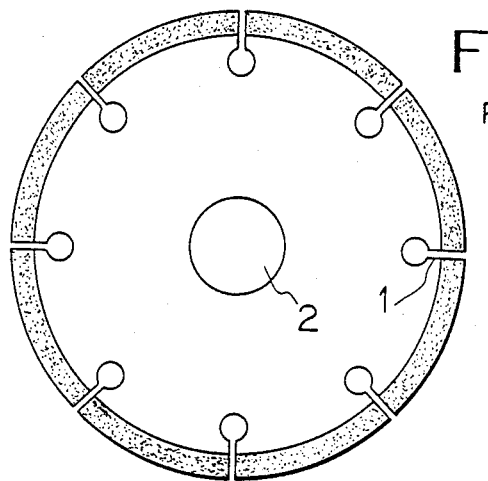
FIG_2
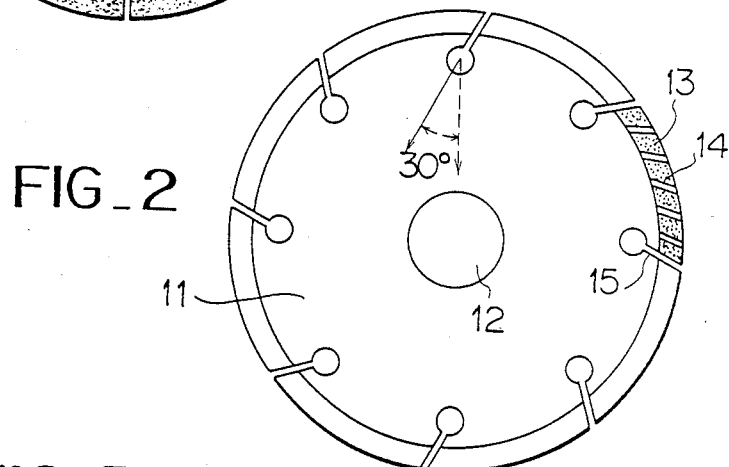
FIG_3
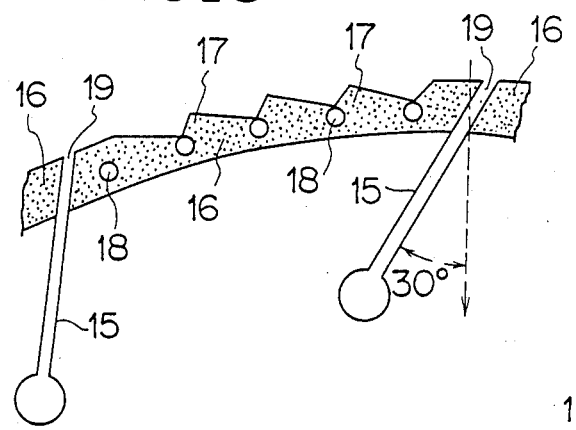
FIG_4
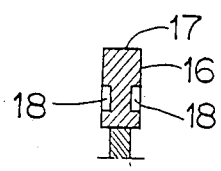

DIAMOND CUTTER

BACKGROUND OF THE INVENTION

1. Field of the Invention

The present invention relates to a diamond cutter, and more particularly to a disc shaped diamond cutter to be used to cutting concretes, building stones, firebricks and others, or to drawing lines in asphalt pavement when breaking it.

2. Description of the Prior Art

The above mentioned sorts are provided with man-made diamonds on a circumferential part of a circular base plate. There are two types, and one of them is that the base plate is formed with a groove on its circumference, and grinding grains are adhered therein, while on the other hand, many arc tips with grinding grains are attached by melting the grams onto the circumference of the base plate. In the both, the friction heat of high temperatures is caused during cutting in the circumferential part of the base plate. Therefore, conventionally, many radial slits 1 have been extended from the circumference toward the central part thereof (FIG. 1). This manner succeeded in releasing the heat to some extent, but the residual heat in the slit 1 was transmitted to an axial hole 2 and brittleness was caused and crackings were invited there. Such inconvenience was more remarkable when the water was not supplied to the cutter during the work (dry system), especially in order to prevent pollution.

Further, since the outermost circumferences were in arc shape in every case, the cutting ability (biting) was unsatisfactory. Thereupon it is assumed that saw shape is applied to a cutting edge in order to increase the cutting ability. If the cutting edge is made actue angled, the cutting ability will be increased, but it will be easily broken, and any measures are wanted.

SUMMARY OF THE INVENTION

An object of the invention is to provide a diamond cutter which dissipates heat during cutting, and prevents the heat from going to the center in order to protect it from crackings.

Another object of the invention is to provide a diamond cutter which has a high cutting ability, though the cutting edge is not so much acute angled, and which is usable after abrasion of the angled edge (main cutting edge), which easily releases cutting dusts and heat, and may be used without supplying water thereto.

Other and further objects, features and advantages of the invention will appear more fully from the following description.

BRIEF DESCRIPTION OF THE DRAWING

FIG. 1 is a front view of a conventional diamond cutter;

FIG. 2 is a front view of an embodiment of the invention;

FIG. 3 is a partial view of another embodiment; and

FIG. 4 is a cross sectional view showing shapes of tips.

DETAILED DESCRIPTION OF THE PREFERRED EMBODIMENTS

The present invention is characterized by forming heat releasing slits angled with respect to the radial direction, and preferred embodiments will be explained in reference to the attached drawing.

In the drawing, a reference numeral 11 designates a disc base plate mainly made of cobalt, and an axial hole 12 is provided centrally therein for supporting a rotation shaft. The circumference of the base plate 11 is made a cutting edge 13 by applying grinding grains of diamonds of small grain sizes. A path 14 is formed between the cutting edges 13 for discharging the cutting dusts. The numeral 15 designates a slit extending from the path 14 toward the central part of the disc, and a plurality of slits are equidistantly placed on the disc (shown ones are eight). Each of the slits 15 is, for example as shown, formed with the groove from the outside of the base plate 11, and is provided with a circular hole. The slit 15 is angled (an illustrated example is angled 30°) with respect to the radial direction (a dotted arrow).

In an embodiment shown in FIG. 3, many tips 16 are attached by melting over the full circumference of the base plate 11 in that spaces 19 are provided in obliquity and communicated with the slits 15. The former 16 is thicker than the latter 11 and is formed with a plurality of angled edges 17 of obtuse angle. Between the angled edges 17, there are provided minor cutting edges 18 of appropriate shape which are depressed or penetrated in thickness in order to serve cutting function.

The diamond cutter according to the present invention is in principle used as existing ones. The friction heat generated during cutting is dispersed into the slits 15 (solid arrow), and since it is not centralized, cracks are not generated in a linear line from the center axial hole 12 to the slit 15, thereby to elongate the tool life. This effect is remarkable especially in the dry system.

With respect to the embodiment shown in FIG. 3, in addition to the above mentioned effect, the cutting edge is angled so that the biting force is strong, and since the minor edge 18 functions as the cutting edge besides the angled edge 17, the cutting efficiency is satisfactory. The cutting dusts are fed along the angled edge 17, which contributes to the cutting efficiency, too. Further, the air easily runs therein due to provision of the slit 15, so that the heat radiation effect is accelerated thereby, and the water need not be supplied during operation. Being an obtuse angle, the cutting edge 17 is not easily broken. Furthermore, after the cutting edge 17 is worn away, the minor cutting edge 18 may succeed the operation, so that the tool life is elongated.

What is claimed is:

1. A diamond cutter provided with man-made diamond grains on the circumference of a disc base plate;
    slits running from the outer curcumference of the disc base plate to the central part thereof at an angle with respect to a radial direction;
    said slits having circular holes at the end of the slits near the central part of the disc plate;
    a plurality of cutting edges of obtuse angles are formed between the slits on the circumference of the disc base plate, said cutting edges being thicker than the disc base plate.

* * * * *